United States Patent
Lu

(10) Patent No.: US 7,986,516 B2
(45) Date of Patent: Jul. 26, 2011

(54) ENGAGING STRUCTURE FOR ELECTRONIC DEVICE

(75) Inventor: Pen-Uei Lu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 196 days.

(21) Appl. No.: 12/337,744

(22) Filed: Dec. 18, 2008

(65) Prior Publication Data

US 2010/0053856 A1 Mar. 4, 2010

(30) Foreign Application Priority Data

Aug. 28, 2008 (CN) .......................... 2008 1 0304261

(51) Int. Cl.
G06F 1/16 (2006.01)
H05K 5/00 (2006.01)
H05K 7/00 (2006.01)
H04M 1/00 (2006.01)
(52) U.S. Cl. ................................ 361/679.23; 455/550.1
(58) Field of Classification Search ............. 361/679.01, 361/679.02, 679.23, 679.58; 455/575.1, 455/575.8, 550.1, 556.1
See application file for complete search history.

(56) References Cited

U.S. PATENT DOCUMENTS

| 7,117,011 | B2 * | 10/2006 | Makino ...................... 455/556.1 |
| 7,269,442 | B2 * | 9/2007 | Sato et al. ................... 455/556.1 |
| 7,542,565 | B2 * | 6/2009 | Tsutaichi et al. ......... 379/433.13 |
| 7,554,800 | B2 * | 6/2009 | Bragg ....................... 361/679.58 |
| 7,656,460 | B2 * | 2/2010 | Wernersson .................. 348/374 |
| 7,693,540 | B2 * | 4/2010 | Kim ........................... 455/550.1 |
| 7,706,837 | B2 * | 4/2010 | Ladouceur ................. 455/556.1 |
| 2004/0041935 | A1 * | 3/2004 | Nagamine et al. ............ 348/335 |
| 2004/0106440 | A1 * | 6/2004 | Haruyama .................... 455/566 |
| 2004/0157652 | A1 * | 8/2004 | Yamazaki ................... 455/575.3 |
| 2005/0107117 | A1 * | 5/2005 | Makino ...................... 455/556.1 |
| 2005/0107118 | A1 * | 5/2005 | Makino ...................... 455/556.1 |
| 2007/0032260 | A1 * | 2/2007 | Kim ........................... 455/550.1 |
| 2008/0171572 | A1 * | 7/2008 | Choi et al. ................. 455/556.1 |
| 2008/0172634 | A1 * | 7/2008 | Choi et al. ..................... 715/822 |
| 2008/0220817 | A1 * | 9/2008 | Nagamine et al. ......... 455/556.1 |

* cited by examiner

*Primary Examiner* — Jayprakash N Gandhi
*Assistant Examiner* — Adrian S Wilson
(74) *Attorney, Agent, or Firm* — Steven M. Reiss

(57) ABSTRACT

An engaging structure for an electronic device includes a first substrate, an engaging member, and a fixed reinforcing member. The first substrate defines at least one guiding slot. The engaging member includes at least one first latching protrusion extending therefrom. The at least one first protrusion engages in the at least one guiding slot. The fixed reinforcing member includes at least one abutting block extending therefrom. The at least one abutting block is configured for abutting against the at least one first latching protrusion.

18 Claims, 9 Drawing Sheets

ENGAGING STRUCTURE FOR ELECTRONIC DEVICE

BACKGROUND

1. Technical Field

The present disclosure relates to an engaging structure, and in particular to an engaging structure for an electronic device.

2. Description of the Related Art

Engaging structures are widely used in different technical fields, especially in electronic devices. Generally, latching slots in one member and corresponding latching protrusions in another member are employed in the engaging structure for engaging. However, the engagement therebetween may be loosened and as a result, one member may easily detach from the other member.

Therefore, what is needed is to provide an engaging structure having a firm engagement.

DETAILED DESCRIPTION OF THE EMBODIMENTS

Figure 1:
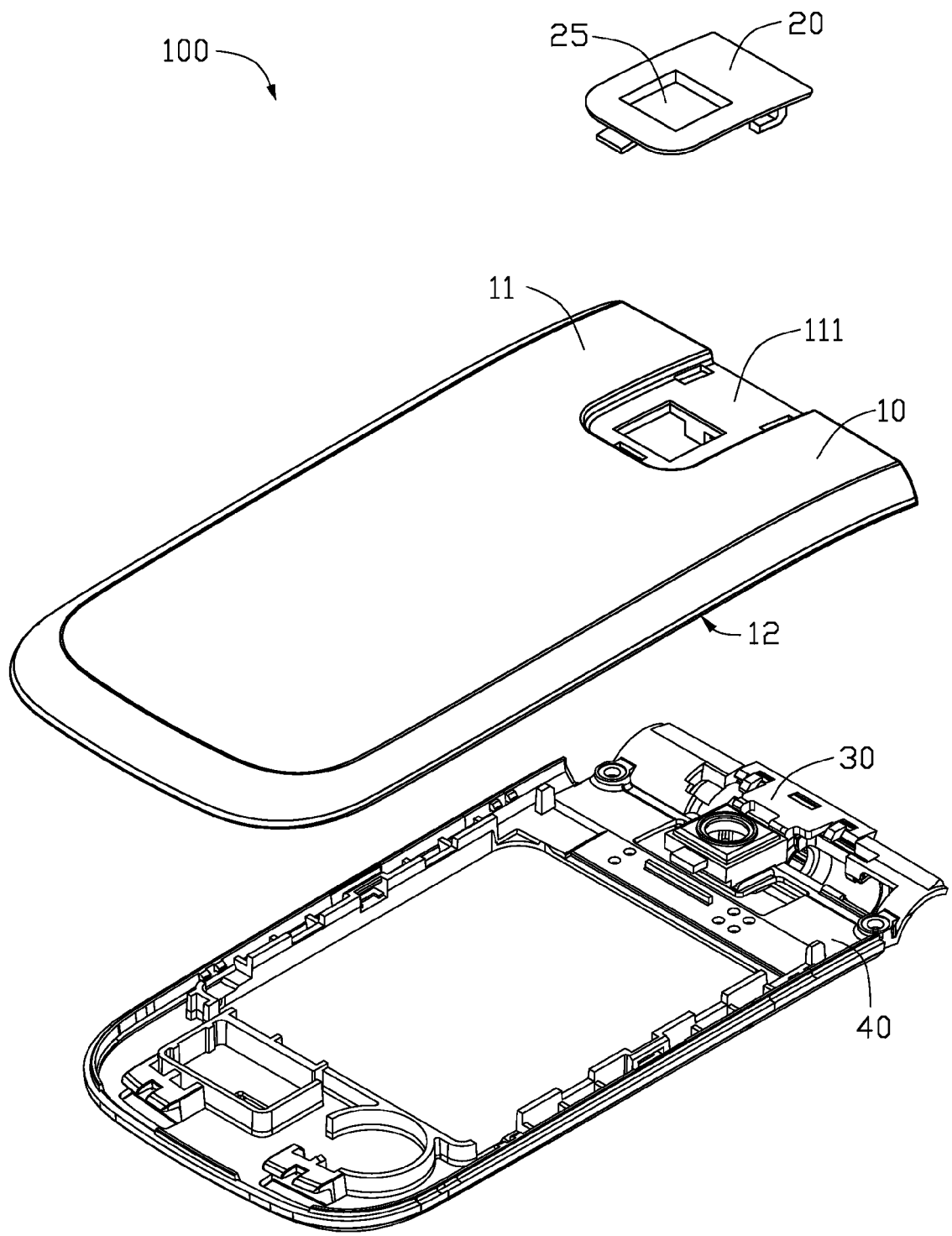
FIG. 1 is a schematic, partial disassembled isometric view of an engaging structure according to an exemplary embodiment.

Referring to FIG. 1, an engaging structure 100 for an electronic device according to an exemplary embodiment includes a first substrate 10, an engaging member 20, a reinforcing member 30 and a second substrate 40. The electronic device may be a mobile phone, or personal digital assistant, etc.

Figure 2:
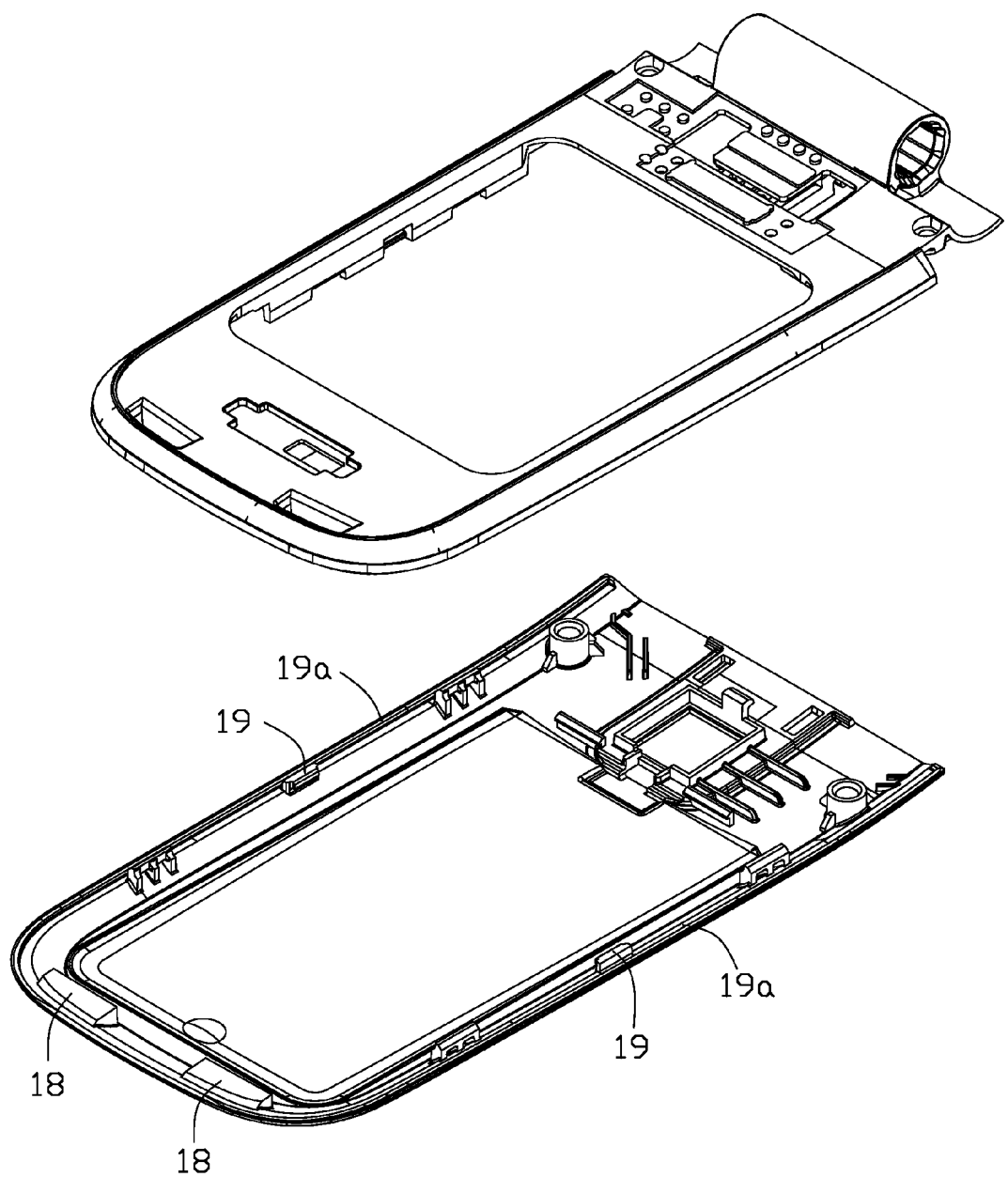
FIG. 2 is similar to FIG. 1, but showing a bottom isometric view of the engaging structure.
Figure 3:
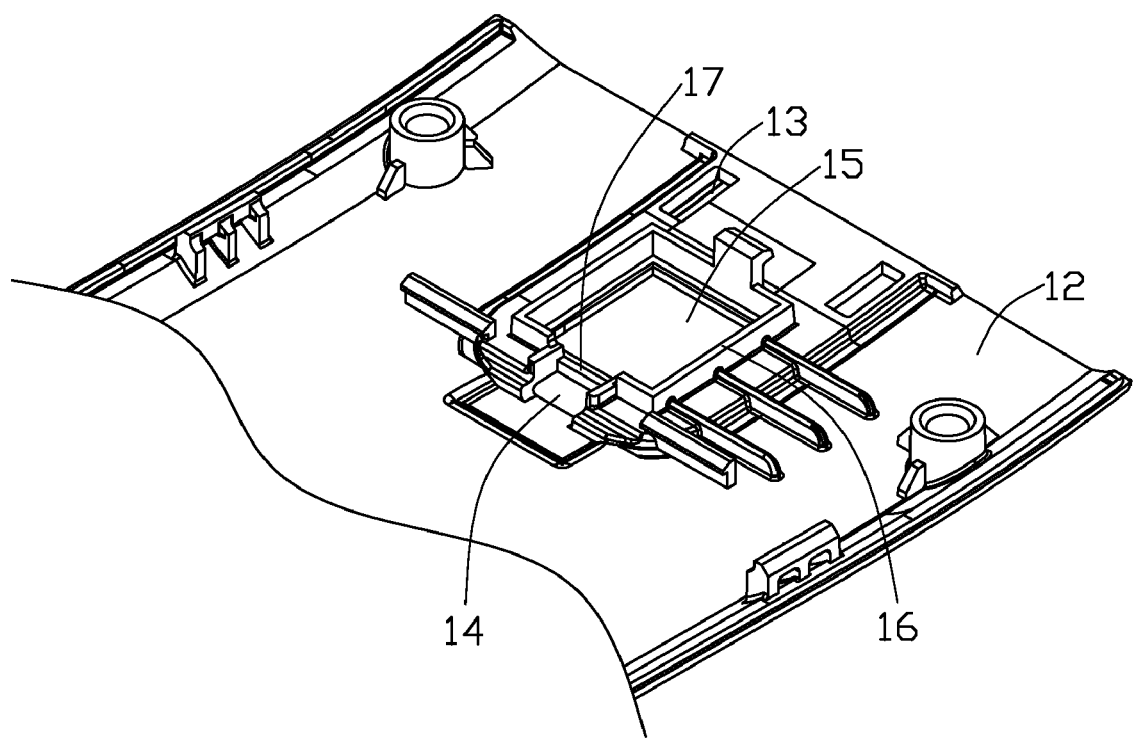
FIG. 3 is a partial bottom isometric view of a first substrate of the engaging structure of FIG. 1.

Referring to FIGS. 2 and 3 together with FIG. 1, the first substrate 10 includes a first surface 11 and an opposite second surface 12 facing the second substrate 40. A recess 111 is defined on the first surface 11 and is shaped and sized to receive the engaging member 20. Two guiding slots 13, a fixing slot 14 and a first through hole 15 are defined through the first substrate 10 in the recess 111. The guiding slots 13 and the fixing slot 14 are defined in an approximately isosceles-triangle fashion at two opposite sides of the first through hole 15. The distance between one guiding slot 13 and the fixing slot 14 is approximately equal to that between another guiding slot 13 and the fixing slot 14. A flange portion 16 is formed on the second surface 12 around the first through hole 15. A cutout 17 is defined at a side of the flange portion 16 close to the fixing slot 14. Two engaging portions 18 are formed away from the flange portion 16 on the second surface 12. Each engaging portion 18 extends towards the first through hole 15. Each engaging portion 18 may define an engaging groove (not shown in FIG. 2). Two side latching protrusions 19 extend respectively from the second surface 12 at two opposite side portions 19a of the first substrate 10.

Figure 4:
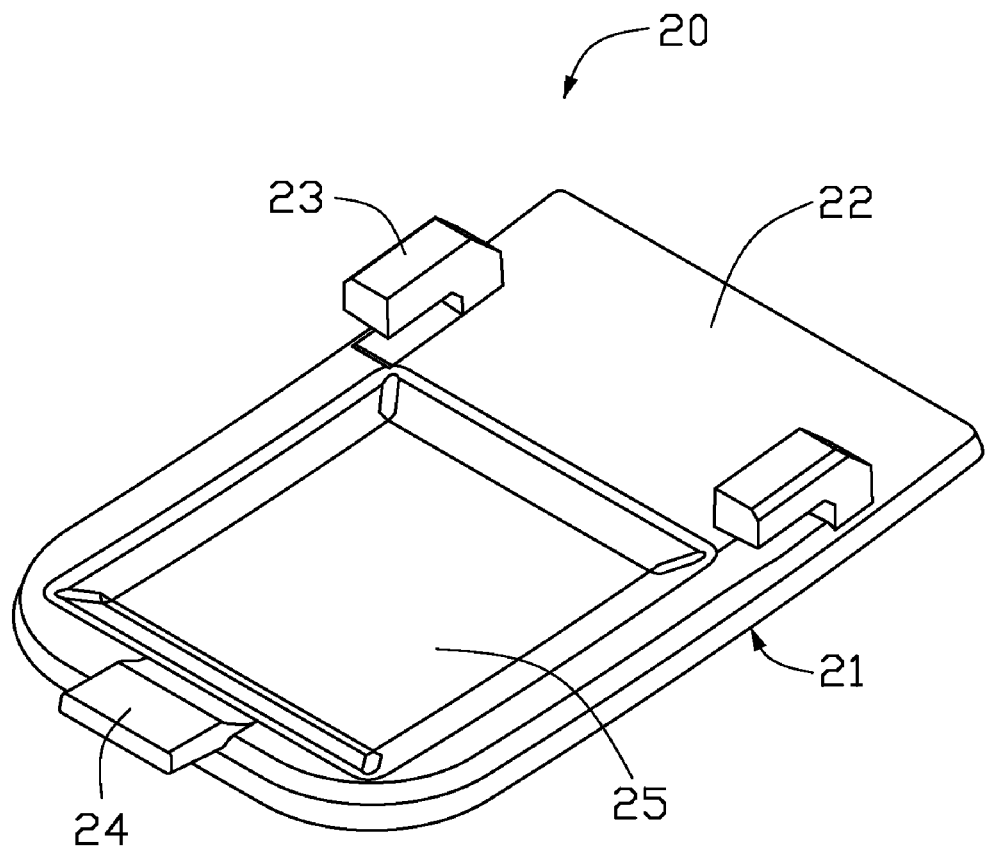
FIG. 4 is a bottom isometric view of an engaging member of the engaging structure of FIG. 1.

Referring to FIGS. 3 and 4, the engaging member 20 includes a top surface 21 and an opposite bottom surface 22. Two first latching protrusions 23 and a fixing protrusion 24 are formed on the bottom surface 22, corresponding to the guiding slots 13 and the fixing slot 14 when the engaging member 20 is coupled to the first substrate 10. The extending directions of distal ends of the two first latching protrusions 23 from the bottom surface 22 are the same as the extending direction of a distal end of the fixing protrusion 24 from the bottom surface 22. A second through hole 25 is defined through the engaging member 20.

Figure 5:
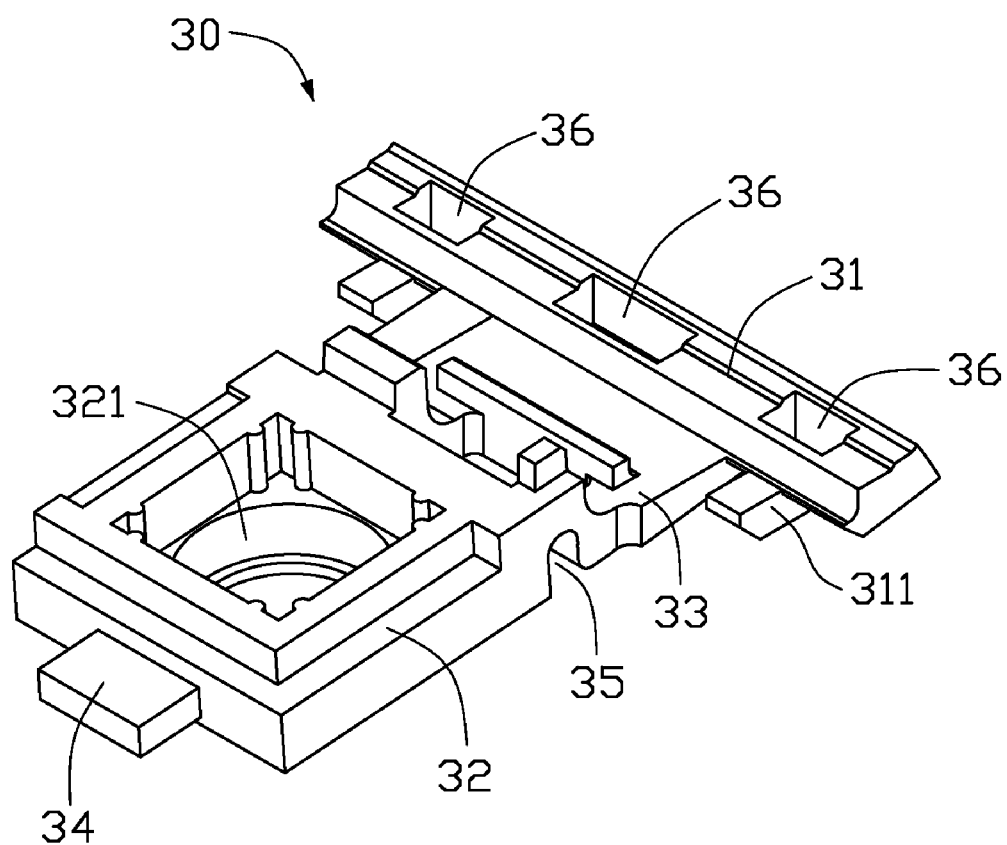
FIG. 5 is a bottom isometric view of a reinforcing member of the engaging structure of FIG. 1.

Referring to FIGS. 3-5, the reinforcing member 30 is made from elastic material, such as rubber or elastic plastic. The reinforcing member 30 is approximately T-shaped and includes an abutting portion 31, a receiving portion 32 and a connecting portion 33 configured for connecting the abutting portion 31 to the receiving portion 32. Two abutting blocks 311 extends from the abutting portion 31 along a direction same as the extending directions of two distal ends of the two first latching protrusions 23. The receiving portion 32 defines a third through hole 321 aligned with the first through hole 15 when the reinforcing member 30 is coupled to the first substrate 10. A lens module (not shown) may be received in the third through hole 321. A stopping block 34 extends from the receiving portion 32 away from the connecting portion 33. When the reinforcing member 30 is coupled to the first substrate 10, the stopping block 34 is received in the cutout 17.

A U-shaped elongated groove 35 is further defined at a surface of the connecting portion 33 facing the first substrate 10 corresponding to the side of the flange portion 16 opposite to the side of the flange portion defining the cutout 17. In this embodiment, three latching slots 36 are separately defined in the abutting portion 31.

Figure 6:
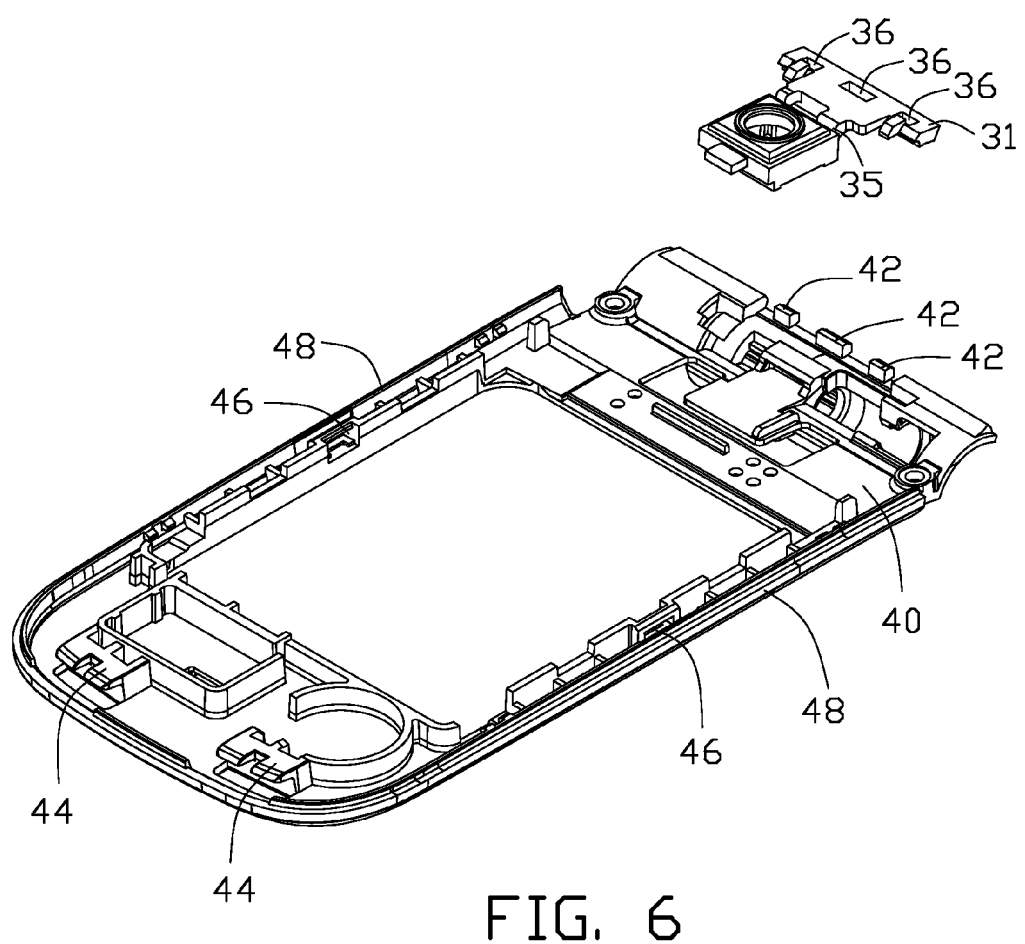
FIG. 6 is a disassembled isometric view of the reinforcing member and a second substrate of the engaging structure of FIG. 1.

Referring to FIG. 6 together with FIGS. 2 and 4, the second substrate 40 includes three second latching protrusions 42 extending towards the reinforcing member 30 corresponding to the latching slots 36. The reinforcing member 30 may be fixed to the second substrate 40 by each second latching protrusion 42 of the second substrate 40 engaging in each latching slot 36 of the reinforcing member 30. Two third latching protrusions 44 extend from the second substrate 40. An extending direction of a distal end of each third latching protrusion 44 is same as that of the distal end of the second latching protrusion 23. Each third latching protrusion 44 may be engaged with a corresponding engaging portion 18. Two engaging grooves 46 are defined at two opposite side portions 48 of the second substrate 40, being engaged by the side latching protrusions 19.

Figure 7:
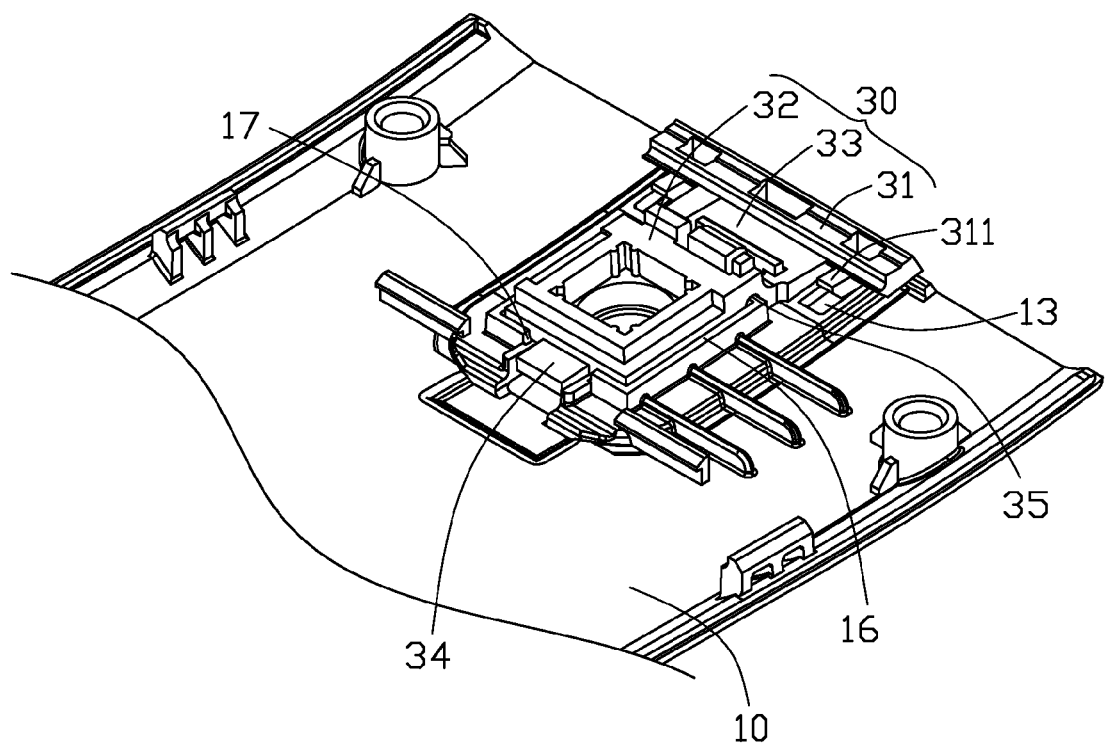
FIG. 7 is a partially assembled bottom isometric view of the engaging structure of FIG. 1, showing the reinforcing member coupled to the first substrate.
Figure 8:
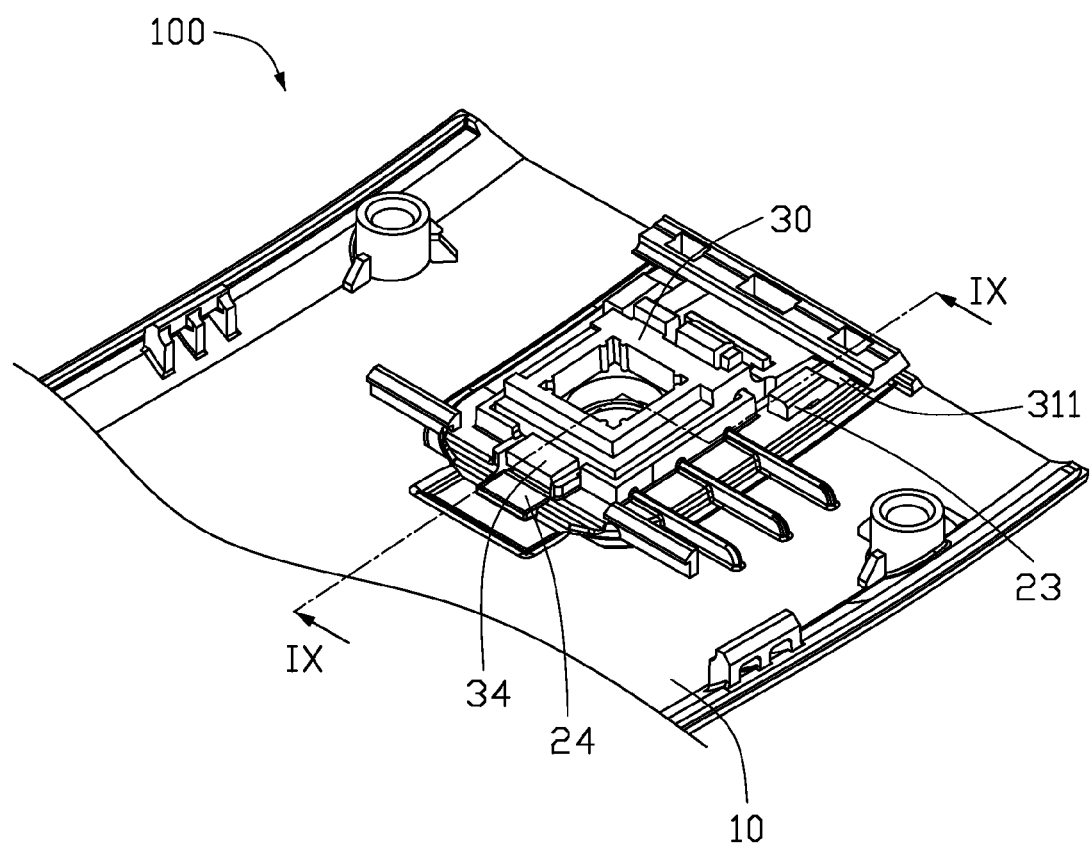
FIG. 8 is an assembled bottom isometric view of the engaging structure of FIG. 1.

Referring to FIGS. 1-2 and 6-9, when the engaging structure 100 is assembled, the reinforcing member 30 is fixed to the second substrate 40 by engaging the third latching protrusion 42 with the second substrate 40 through the latching slot 36, as shown in FIG. 1. The first substrate 10 is coupled to the second substrate 40 by an engagement between the side latching protrusion 19 and the engaging groove 46, and by an engagement between the engaging portions 18 and the third latching protrusions 44 (the third protrusion 44 is engaged in the engaging groove of the engaging portion 18). As a result, the abutting blocks 311 of the reinforcing member 30 directly face the guiding slots 13 and the first through hole 15 is aligned with the third through hole 321, as shown in FIG. 7. The side of the flange portion 16 corresponding to the elongated groove 35 is received in the elongated groove 35. In this way, the receiving portion 32 can be easily and accurately received in the flange portion 16. Alignment between the first through hole 15 and the third through hole 321 can be easily achieved (seen in FIGS. 3, 5 and 7). The fixing protrusion 24 is received in the fixing slot 14 by guidance of the stopping block 34. The stopping block 34 is received in the cutout 17.

Figure 9:
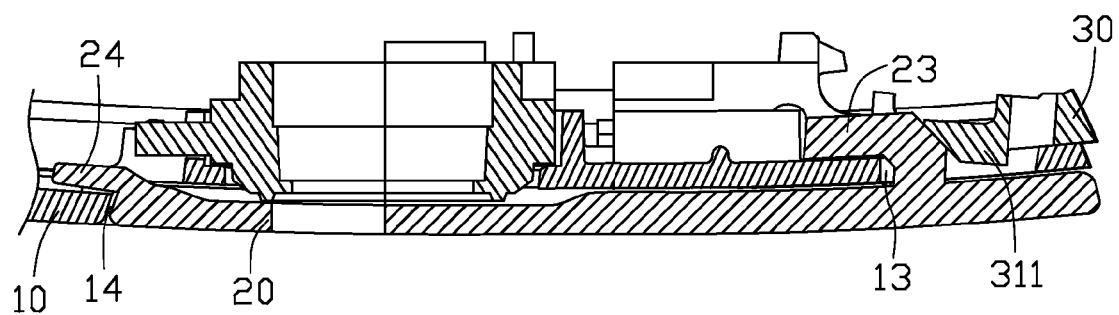
FIG. 9 is a cross-sectional view taken along line IX-IX of the engaging structure of FIG. 8, showing the first latching protrusion abutting against the abutting block.

The engaging member 20 is coupled to the first substrate 10 and received in the recess 111. The second latching protrusion 23 engages in the guiding slot 13 and abuts against the corresponding abutting block 311. The second through hole 25 is aligned with the first through hole 15. Light may pass through the second through hole 25 and the first through hole 15 in that order to be received by a lens module (not shown) in the receiving portion 32. Referring to FIG. 9, when the abutting block 311 is abutted by the second latching protrusion 23, the abutting block 311 is deformed to generate stress to the second latching protrusion 23 towards the extending direction of the distal end of the second latching protrusion 23. In this way, the engaging member 20 can engage with the first substrate 10 firmly and permanently.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An engaging structure for an electronic device comprising:
    a first substrate defining at least one guiding slot;
    an engaging member comprising at least one first latching protrusion extending therefrom, the at least one first protrusion engaging in the at least one guiding slot; and
    a fixed reinforcing member comprising at least one abutting block extending therefrom and the at least one abutting block facing the at least one guiding slot and abutting against the at least one first latching protrusion, the reinforcing member comprising an abutting portion, a receiving portion and a connecting portion configured for connecting the abutting portion to the receiving portion; the at least one abutting block extending from the abutting portion and the extending direction of a distal end of the at least one abutting block being the same as the extending direction of a distal end of the at least one first latching protrusion.

2. The engaging structure as claimed in claim 1, further comprising a second substrate being fixedly coupled to the first substrate, and the fixed reinforcing member being fixed to the second substrate.

3. The engaging structure as claimed in claim 2, wherein the fixed reinforcing member defines at least one latching slot; at least one second latching protrusion extends from the second substrate toward the fixed reinforcing member and engages in the at least one latching slot.

4. The engaging structure as claimed in claim 1, wherein the at least on abutting block is made from an elastic material.

5. The engaging structure as claimed in claim 1, wherein the first substrate defines a fixing slot spaced from the at least one guiding slot; the engaging member comprises a fixing protrusion engaging in the fixing slot.

6. The engaging structure as claimed in claim 5, wherein the extending direction of a distal end of the at least one first latching protrusion is the same as the extending direction of a distal end of the fixing protrusion.

7. The engaging structure as claimed in claim 5, wherein the first substrate defines a first through hole between the at least one guiding slot and the fixing slot, and the engaging member defines a second through hole being aligned with the first through hole.

8. The engaging structure as claimed in claim 1, wherein a flange portion is formed on the first substrate around the first through hole.

9. The engaging structure as claimed in claim 8, wherein the connecting portion defines a U-shaped elongated groove receiving a side of the flange portion corresponding to the elongated groove.

10. The engaging structure as claimed in claim 1, wherein the receiving portion comprises a stopping block extending away from the connecting portion and being configured for guiding the fixing protrusion to engage in the fixing slot.

11. The engaging structure as claimed in claim 2, wherein the first substrate comprises two engaging portions positioned on a surface of the first substrate facing the second substrate, and two side latching protrusions extending from the surface of the first substrate facing the second substrate at two opposite side portions of the first substrate.

12. The engaging structure as claimed in claim 11, wherein the second substrate comprises two third latching protrusions extending therefrom and defining two engaging grooves at two opposite side portions of the second substrate; each third latching protrusion is engaged with each engaging portion; the two engaging grooves are engaged in by the side latching protrusions.

13. An engaging structure for an electronic device comprising:
    a first substrate defining at least one guiding slot;
    an engaging member comprising at least one first latching protrusion extending therefrom, the at least one first protrusion engaging in the at least one guiding slot;
    a reinforcing member comprising at least one abutting block extending therefrom and the at least one abutting block facing the at least one guiding slot and abutting against the at least one first latching protrusion, the reinforcing member comprising an abutting portion, a receiving portion and a connecting portion configured for connecting the abutting portion to the receiving portion; the at least one abutting block extending from the abutting portion and the extending direction of a distal end of the at least one abutting block being the same as the extending direction of a distal end of the at least one first latching protrusion; and
    a second substrate being fixedly coupled to the first substrate, and the reinforcing member being fixed to the second substrate.

14. The engaging structure as claimed in claim 13, wherein the fixed reinforcing member defines at least one latching slot; at least one second latching protrusion extends from the second substrate toward the fixed reinforcing member and engages in the at least one latching slot.

15. The engaging structure as claimed in claim 13, wherein the first substrate defines a fixing slot spaced from the at least one guiding slot; the engaging member comprises a fixing protrusion engaging in the fixing slot.

16. The engaging structure as claimed in claim 15, wherein the extending direction of a distal end of the at least one first latching protrusion is the same as the extending direction of a distal end of the fixing protrusion.

17. The engaging structure as claimed in claim 15, wherein the first substrate defines a first through hole between the at least one guiding slot and the fixing slot, and the engaging member defines a second through hole being aligned with the first through hole.

18. The engaging structure as claimed in claim 13, wherein a flange portion is formed on the first substrate around the first through hole.

* * * * *